United States Patent [19]
Mori et al.

[11] Patent Number: 5,806,058
[45] Date of Patent: Sep. 8, 1998

[54] INDEX MANAGING METHOD IN DATABASE MANAGING SYSTEM

[75] Inventors: Yasuharu Mori, Yokohama; Nobuo Kawamura, Sagamihara, both of Japan

[73] Assignee: Hitachi, Ltd., Tokyo, Japan

[21] Appl. No.: 668,684

[22] Filed: Jun. 24, 1996

[30] Foreign Application Priority Data

Jun. 26, 1995 [JP] Japan .................................. 7-159116

[51] Int. Cl.⁶ ..................................................... G06F 7/00
[52] U.S. Cl. ................................................ 707/2; 707/200
[58] Field of Search ................................ 707/1, 2, 3, 200

[56] References Cited

U.S. PATENT DOCUMENTS

| | | | |
|---|---|---|---|
| 5,146,590 | 9/1992 | Lorie et al. .............................. | 395/600 |
| 5,307,486 | 4/1994 | Nakamigawa ........................... | 395/600 |
| 5,404,510 | 4/1995 | Smith et al. ............................. | 395/600 |
| 5,440,732 | 8/1995 | Lomet et al. ............................ | 395/600 |
| 5,490,258 | 2/1996 | Fenner .................................... | 395/401 |
| 5,551,027 | 8/1996 | Choy et al. .............................. | 395/600 |
| 5,553,303 | 9/1996 | Hayashi et al. ......................... | 395/600 |
| 5,604,901 | 2/1997 | Kelley et al. ............................ | 395/603 |
| 5,659,730 | 8/1997 | Kelley et al. ............................ | 395/603 |
| 5,727,196 | 3/1998 | Strauss, Jr. et al. .................... | 395/602 |

FOREIGN PATENT DOCUMENTS

| | | |
|---|---|---|
| 522 363 | 1/1993 | European Pat. Off. . |
| 715 269 | 11/1995 | European Pat. Off. . |
| 747 839 | 3/1996 | European Pat. Off. . |

OTHER PUBLICATIONS

Aluru et al. "Simulation of the Hydrodynamic Device Model on Distributed Memory Parallel Computers", IEEE Transactions on Computer–Aided Design of Integrated Circuits and Systems, vol. 15, No. 9, Sep. 1996.

Matsliach et al. "A Combined Method for Maintaining Large Indices in Multiprocessor Multidisk Environments" IEEE Transactions on Knowledge and Data Engineering, vol. 6, No. 3, Jun. 1994.

*Primary Examiner*—Thomas G. Black
*Assistant Examiner*—Michael J. Wallace, Jr.
*Attorney, Agent, or Firm*—Antonelli, Terry, Stout & Kraus, LLP

[57] ABSTRACT

A database managing system for effecting management in accessing data stored in a database via an index is so configured so as to prevent duplication of index key values and increase of index key values from degrading the access performance and lowering the storage efficiency of the index. Upon receiving, from an application program, a request to add a data record, a database manager adds this data record to a data portion and effects addition and update of an index record in an index portion. An index manager intervenes in this processing and excepts, from the index portion, an index record containing an index key value which has reached an upper limit value of the number of duplications preset in an exception key managing table. At the time of recreation of the index, the index manager refers to access time contained in index records and excepts index records which have not been accessed during an elapse of a fixed period of time.

17 Claims, 4 Drawing Sheets

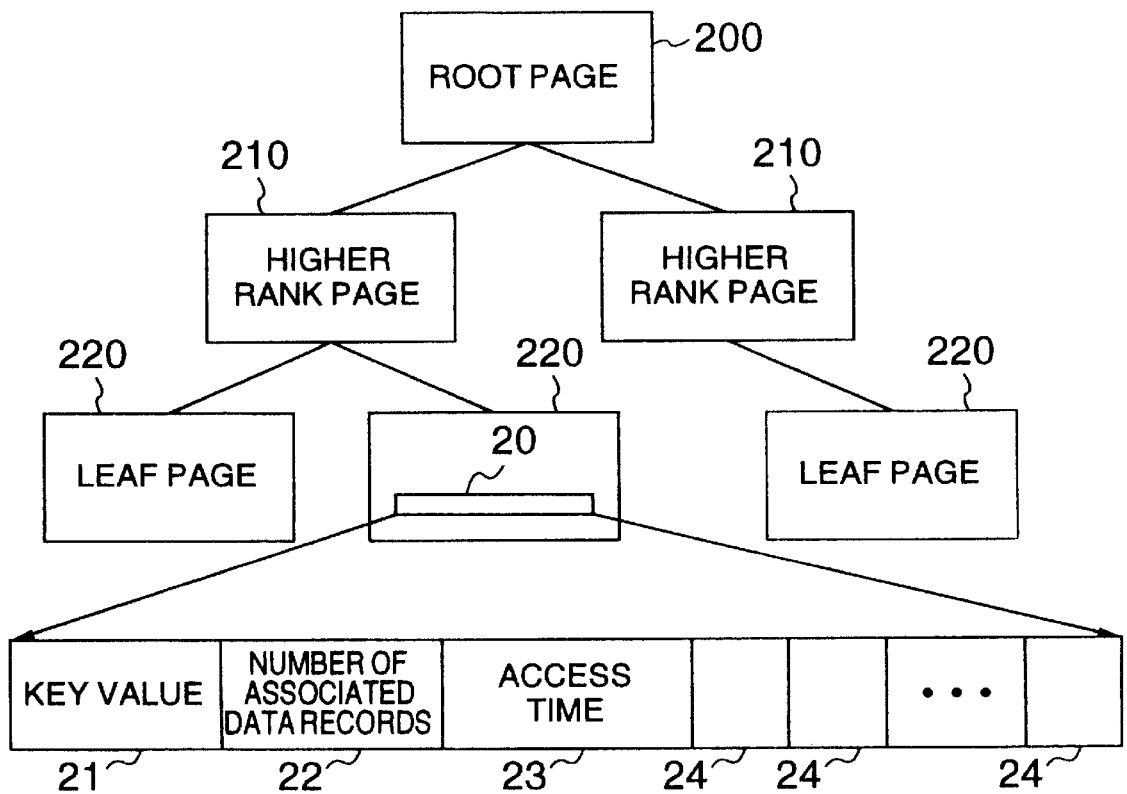

INDEX MANAGING METHOD IN DATABASE MANAGING SYSTEM

BACKGROUND OF THE INVENTION

The present invention relates to database managing systems, and in particular to an index managing method in database managing systems in which a database manager accesses data records via indexes.

In a conventional database managing system, there are provided indexes each having a plurality of index records in order to shorten the time required for a database manager to access a data record stored in a database so that the database manager can access the data record via an index. Index records indicate registered association of index key values with storage locations of data records. The index records are provided as a partial area in the database or an index file independent of the database. Such an index is disclosed, for example, in Claudio Sartori, et al., "Partial Indexing for Nonuniform Data Distributions in Relational DBMS's," IEEE Transactions on Knowledge And Data Engineering, Vol. 6, No. 3, June 1994, pp. 420–429.

In the case of a database in which addition of data records is frequently conducted, however, the number of index records stored in the index file increases. If the number of index records becomes too many as a result, the existence of the indexes exerts, on the contrary, an evil influence upon the performance of access to the database in some cases.

It is now assumed that association of too many data records with the same index key value, i.e., so-called duplication of an index key value has occurred. If in this case the database manager specifies this index key value to search the database, the number of record data obtained as a result of the search becomes very great. As a result, data records cannot be sufficiently narrowed down. In addition, the CPU time for accessing a data record via such an index record and the number of times of input/output operation for the database increase, resulting in degraded performance of access to the database.

When a data record is to be added or deleted via an index having many index key values each associated with a large number of data records, the number of times of input/output operation for the database and the journal output amount at the time of update of an index record with respect to such an index key value associated with a plurality of data records increase, resulting in degraded performance of access to the database.

Furthermore, in the case of a database in which data records are frequently added, the access frequency for old data records typically falls as data increase. Nevertheless, such old data records continue to be held in the index in some cases. This results in a problem that the storage efficiency of the index gradually falls and the performance of access to the database via an index is degraded in such cases.

SUMMARY OF THE INVENTION

An object of the present invention is to provide a database managing method improved in performance of access to a database by removing an evil influence caused by an index file in a database managing system using indexes.

Another object of the present invention is to provide a database managing system using indexes which is improved in storage efficiency of indexes.

In accordance with one aspect of the present invention, associated data records for each of index key values included in each index are counted, and when the number of associated data records has reached a predetermined number, the database is directly accessed without passing through an index record having the index key value. As one concrete method thereof, the index key value is deleted from the index portion of the database or the index file.

In accordance with another aspect of the present invention, old index records are deleted. In one concrete example thereof, each index record has a field for writing therein time when that record has been accessed. Each time the index record is accessed, the access time is updated. An index record (index key value) for which a predetermined time period has elapsed from the last time when the index record was accessed is deleted from the index portion of the database or the index file.

An index record including an index key value associated with a large number of data records or an index key value for which a predetermined period of time has elapsed from the last time when the index record was accessed is thus deleted from the index portion (or the index file). Thereby, only index key values associated with relatively small number of data records or index key values which are high in access frequency are held in the index. As a result, the problems concerning the performance of access to the database and storage efficiency of the index are solved.

BRIEF DESCRIPTION OF THE DRAWING

FIG. 2 is a diagram showing an example of the configuration of each of indexes stored in an index portion 2 in the embodiment according to the present invention;

FIG. 3 is a diagram showing the data format of an exception key managing table in the embodiment according to the present invention;

DESCRIPTION OF THE PREFERRED EMBODIMENT

Figure 1:
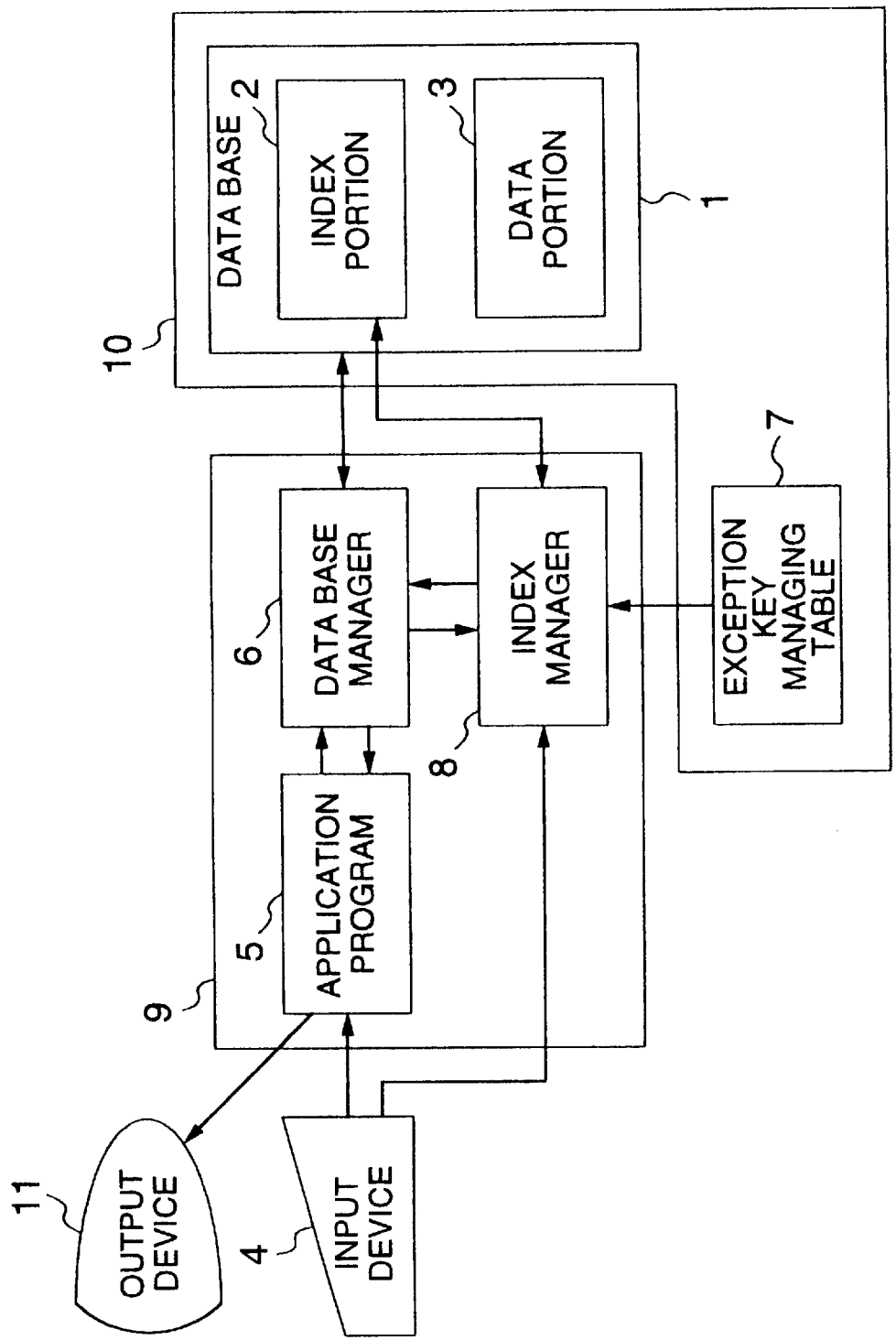
FIG. 1 is a diagram showing an example of the configuration of a database managing system in an embodiment according to the present invention.

Hereafter, an embodiment of the present invention will be described by referring to the drawings.

FIG. 1 is a diagram showing an example of a database managing system in the present embodiment. Numeral 1 denotes a database. The database 1 includes an index portion 2 and a data portion 3. The index portion 2 is an area storing an index table for accessing the data portion 3. The index portion 2 typically stores a plurality of indexes, and each index has a plurality of index records. The data portion 3 is an area storing a large number of data records. Numeral 4 denotes an input device for inputting a transaction record or inputting a command concerning data processing.

Numeral 5 denotes an application program accessing a data record on the database 1 on the basis of data or a command inputted from the input device 4 and issuing a request to add a new data record. Numeral 6 denotes a database manager, responsive to a data processing request concerning the database 1, for accessing a data record on the data portion 3 via the index portion 2 and adding a new index record (entry) and a new data record to the index portion 2 and the data portion 3, respectively.

Numeral 7 denotes an exception key managing table provided to manage index records (index key values) to be excepted from the index portion 2. Numeral 8 denotes an index manager. At the time of addition of a data record to the database 1, control is delivered from the database manager 6 to the index manager 8. By referring to the exception key managing table 7, the index manager 8 deletes, from the index portion 2, key values which have reached an upper limit number of associated data records. Furthermore, by referring to the exception key managing table 7 at the time of recreation of the index portion 2, the index manager 8 deletes, from the index portion 2, index key values which are low in access frequency.

Numeral 9 denotes a processor including the application program 5, the database manager 6, and the index manager 8. Numeral 10 denotes an external storage device including the database 1 and the exception key managing table 7. Numeral 11 denotes an output device for outputting a result of data processing.

Execution in the application program 5, the database manager 6, and the index manager 8 is conducted according to a managing program stored in a storage medium (not shown) included in the processor 9. The exception key managing table 7 is copied into a storage device (not shown) of the processor 9 and used. The input device 4 and the output device 11 are peripheral devices or terminal devices connected to the processor 9.

FIG. 2 is a diagram showing an example of the configuration of an index stored in the index portion 2. Index key values are configured so as to start from a key value stored in a root page 200, trace in order key values arranged in a hierarchical structure, pass through a higher rank page 210, and reach an index key value (index record) stored in a leaf page 220 located at the lowest layer. An index record 20 stored in the leaf page 220 includes a field for storing an index key value 21, a field for storing the number of associated data records 22, a field for storing access time 23, and fields for respectively storing pointers 24. Each of the pointers 24 stores an address, in the database 1, of a data record associated with the index key value of the index record 20. The index key value 21 is indicated with alphanumeric characters or the like. The number of associated data records 22 is a numerical value indicating how many data records the same index key value 21 is associated with. The access time 23 records the last time (e.g., year, month, day, hour, minute and second) when the index key value 21 was accessed. The pointer 24 indicates the storage address in the data portion 3 in which the data record associated with that index key value 21 is stored. Therefore, as many pointers 24 as the number stored in the number of associated data records 22 exist. Each of the pointers 24 indicates the storage address of a data record. By the way, the index key value is defined in relation to contents of an item included in the data record.

FIG. 3 is a diagram showing an example of the data format of the exception key managing table 7. An index name 71 is a name of an index system defined for each of tables included in the database 1. An upper limit number 72 of data records associated with a key value indicates the number of associated data records used when it is determined whether the index key value 21 should be excepted. When the number of associated data records 22 has reached the upper limit number 72 of data records associated with a key value, an index record 20 having the key value 21 is excepted. A key value holding period of time 73 indicates the time period during which index key values 21 which are not accessed are held in the index portion 2. In the exception key value list 74, all index key values 21 excepted from the index portion 2 are recorded. In the initial state, therefore, any index key value does not exist in the exception key value list 74.

Operation will now be described by referring to FIG. 1. Upon receiving, from the application program 5, a request of reference or update using index specification with respect to a data record stored in the data portion 3, the database manager 6 accesses the index portion 2 on the basis of a given index key value, updates the access time 23 associated with the pertinent index key value 21 by using the current accessed time, then takes out a data record stored in the data portion 3 and specified by the pointer 24, and delivers the data record to the application program 5.

Figure 4:
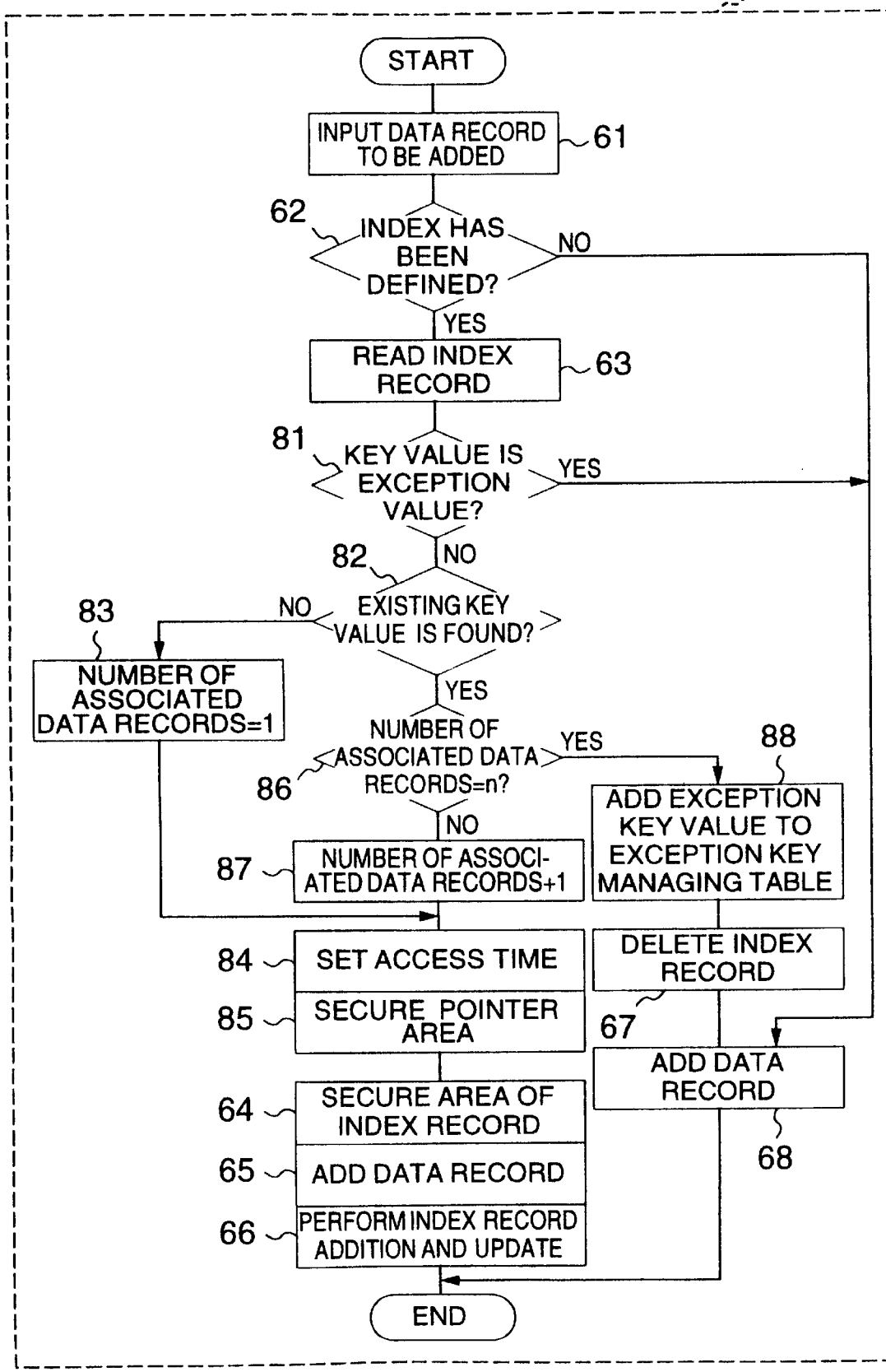
FIG. 4 is a flow chart showing the processing flow of a database manager 6 and an index manager 8 in the embodiment according to the present invention.

FIG. 4 is a flow chart showing the flow of processing conducted in the database manager 6 and the index manager 8 in the case where a data record is to be added to the database 1. Steps 61 through 68 denote processing conducted in the database manager 6. Steps 81 through 88 denote processing conducted in the index manager 8.

When a transaction record to be added has been inputted from the input device 4, the application program 5 processes it, and issues, to the database manager 6, a request to add a data record to the database 1. The database manager 6 receives this data record to be added (step 61). If this data record has been defined with an index key in a table in the data portion 3 to which data record is to be added ("yes" in step 62), the database manager 6 accesses the index portion 2 to read the pertinent index record (step 63). The result of the access is delivered to the index manager 8. As described below, the processing of the index manager differs depending upon whether or not the specified index key value exists in the index portion 2.

When no index records having the key value exist, the index manager 8 has to determine either that the corresponding index record has been deleted or that the data record is the first one for that index record. Therefore, the index manager 8 determines whether the specified index key value has been already registered in the exception key value list 74 in the exception key managing table 7 (step 81). If the index key value is an exception key value ("yes" in step 81), then control is immediately delivered to the database manager 6, and the database manager 6 adds the data record to the rear end of the data portion 3 (step 68). If the specified index key value has not already been registered as an exception key value ("no" in step 81) and an already existing key value thereof is not found ("no" in step 82), then the data record is the first data record for the index record. In an index record having the specified key value in the index key value 21, therefore, the number of associated data records 22 is set to "1" (step 83), the current time is set in the access time 23 (step 84), the area of a pointer 24 for the given data record is set (step 85), and control is delivered to the database manager 6. The database manager 6 secures the area of this index record in the index portion 2 (step 64), adds the given data record to the data portion 3 (step 65), and stores an index record having the storage address of the given data record set in the pointer 24 (step 66).

If an index record having that index key value exists in the index portion 2 ("no" in step 81 and "yes" in step 82), the number of associated data records 22 included in the index record is compared with the upper limit number 72 of data records associated with the key value set in the exception key managing table 7 for the index containing the index record (step 86). If the upper limit number 72 of data records associated with the key value has not been reached ("no" in step 86), the index manager 8 adds one to the contents of the number of associated data records 22 of that index record 20 (step 87), and conducts processing of the steps 84 and 85. As a result, the length of the index record increases by the length of a pointer 24. Therefore, the database manager 6 secures, in the index portion 2, an area for storing the index record to be updated (step 64), adds the data record to the data portion 3 (step 65), and stores, in the index portion 2, an index record having the storage address of the data record added to the pointers 24 (step 66). As occasion demands, the original index record is deleted and an index record after update is added.

If at the step 86 the number of associated data records 22 has reached the upper limit number 72 of data records associated with the key value ("yes" in step 86), then the index manager 8 addes, to the exception key value list 74, a specified key value in the data record requested to be added (step 88) and the index manager 8 delivers control to the database manager 6. The database manager 6 deletes that index record from the index portion 2 (step 67) and adds the data record to the rear end of the data portion 3 (step 68).

If the index has not been defined ("no" in step 62), control is immediately delivered to the database manager 6 and the database manager 6 adds a data record to the rear end of the data portion 3 (step 68).

The performance of access to the database is further improved by effecting an exchange of the step 63 and the step 81.

Figure 5:
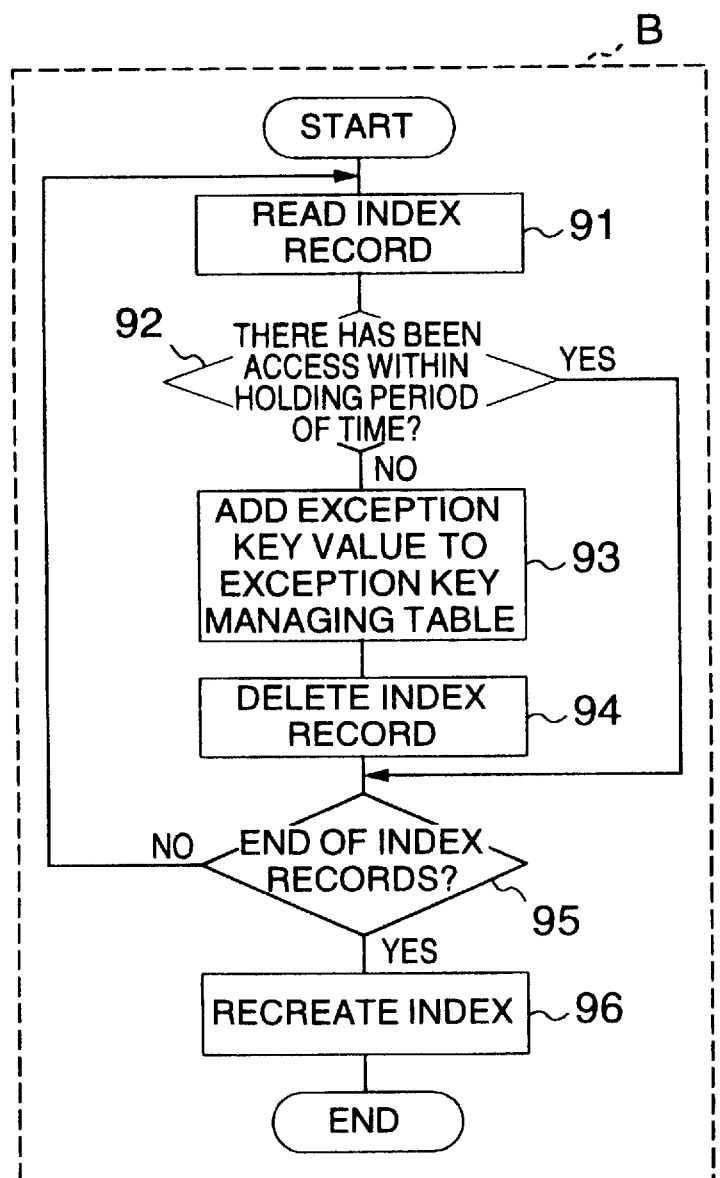
FIG. 5 is a flow chart showing the flow of processing of key value exception conducted at the time of index recreation in the embodiment according to the present invention.

FIG. 5 is a flow chart showing the flow of processing conducted in the index manager 8 to delete, from the index portion 2, an index record having a key value which is not accessed even if the key value holding period of time 73 set beforehand at the time of recreation (reorganization) has elapsed. Index recreation is periodically started by a timer for example.

In response to a command given from the input device 4, the index manager 8 reads the first index record in a leaf page with respect to an index (71 of FIG. 3) stored in the index portion 2 (step 91). The difference between the current time and the access time 23 included in the index record 20 which has been read is compared with the key value holding period of time 73 of that index included in the exception key managing table 7 (step 92). If the key value holding period of time 73 is smaller than this difference ("no" in step 92), then the key value of the index record is added to the exception key value list 74 in the exception key managing table 7 (step 93) and the index record is deleted from the index portion 2 (step 94).

If the key value holding period of time 73 is equal to or longer than this difference ("yes" in step 92), then the index record is due to be preserved, and processing proceeds to step 95. If a check on all index records included in the index has not been completed ("no" in step 95), processing of the steps 91 to 94 is repeated for the next index record in the sequential order of key values. When the check on all index records has been completed for the index ("yes" in step 95), the index is recreated (step 96). When the recreation of the index group has been finished, the above described processing is repeated for the next index.

The procedure of the flow chart shown in FIG. 4 or 5 is contained in a medium such as ROM, DISC or other storage means included in the processor 9 shown in FIG. 1 in the form of codes as a medium portion A or B.

Data records having key values excepted from the index portion 2 are accessed by directly searching the data portion 3 for a value of the specified data item.

In the above described embodiment, the number of associated data records 22 and the access time 23 have been strored in the index record. However, the present invention can be effected even if a table for setting association of the index key value 21 with the number of associated data records 22 and/or the access time 23 is provided independently of the index portion 2. The index manager 8 is informed by the database manager 6 at the time of addition of a data record, and the index manager 6 can update the number of associated data records and register the new association of the key value 21 with the number of associated data records 22 into the table. Furthermore, the database manger 6 or the index manager 8 can update the access time 23 included in this table at the time of reference, update and addition.

When the number of associated data records of a key value stored in the index portion 2 has exceeded a predetermined value, or when a key value which has not been accessed even after an elapse of a fixed period of time has occurred, an index record containing such a key value is deleted in the present embodiment. Therefore, the storage efficiency of the index portion 2 can be improved. Furthermore, since the total number of index records is reduced, the search, update and addition operation of a data record in the data portion 3 using indexes can be conducted at a higher speed. If the number of data records associated with a key value is great, the number of data hit by using an index becomes great especially at the time of searching the database 1. Therefore, data to be searched for cannot be sufficiently narrowed down. Thus there sometimes occurs an evil effect that unnecessary input/output is generated by index access. In the present embodiment, however, such an evil effect is reduced and the access performance of the database managing system as a whole can be improved. Furthermore, at the time of update of the database 1, update processing of the key value of the excepted index becomes advantageously unnecessary and the output amount of the index journal at the time of index update is advantageously reduced.

No matter whether key value exception using the number of data records associated with a key value or key value exception using the access time is used, the above described effect can be achieved. In particular, the former method has a large effect of mitigating the evil effect at the time of database search. Furthermore, if both methods are used in combination, key values are excepted according to the number of associated data records and old key values included in key values which do not reach a predetermined number of associated data records are excepted. In other words, screening of two stages can be conducted and multiplicative effects can be obtained.

In another embodiment, the index manager 8 calculates the ratio of the number of key values having the number of associated data records 22 equivalent to or greater than a predetermined number to the total number of key values in each index. When this ratio has exceeded a fixed value, all index records having the former key values may be deleted from the index portion 2. Also when this method is used, the above described effect can be achieved.

We claim:

1. In a database managing system having a database for storing a plurality of data records, data processing being conducted by using an index including a plurality of index records, each of said index records being created by associating an index key value with a storage location of at least one data record in said database relating to said index key value, an index managing method executed by a processor, comprising the steps of:

(a) in response to a processing request on a certain data record, checking on a number of associated data records belonging to an index record relating to said data record requested to be processed, on the basis of an index key value defined in said data record requested to be processed;

(b) comparing said number of associated data records with a predetermined upper limit number; and (c) in response to arrival of said number of associated data records at said upper limit number, accessing said data record requested to be processed stored in said database without using said storage location in said database stored in said relating index record.

2. An index managing method according to claim 1, wherein said processor deletes an index record having said number of associated data records which has reached said upper limit number.

3. An index managing method according to claim 1, wherein each of said index records has a field for setting therein said number of associated data records belonging to the index record.

4. An index managing method according to claim 1, wherein said database managing system includes an exception key value table having a list of index key values of index records each having said number of associated data records which has reached said upper limit number, and at said step (c), said processor determines whether said number of associated data records has reached said upper limit number by referring to said exception key table.

5. An index managing method according to claim 4, wherein said upper limit number is set beforehand in said exception key value table.

6. In a database managing system having a database for storing a plurality of data records, data processing being conducted by using an index including a plurlaity of index records, each of said index records being created by associating an index key value with a storage location of at least one data record in said database relating to said index key value, an index managing method executed by a processor, comprising the steps of:

(a) checking on nonaccess period of time of an index record;

(b) comparing said nonaccess period of time with a predetermined upper limit holding period of time; and (c) in response to arrival of said nonaccess period of time at said upper limit holding period of time, deleting said index record.

7. An index managing method according to claim 6, wherein each of said index records has a field for setting therein latest access time of data records belonging to the index record, and at said step (b), said nonaccess period of time is calculated on the basis of a difference between current time and said latest access time.

8. An index managing method according to claim 6, wherein said database managing system includes an exception key value table having a list of index key values of index records deleted at said step (c), and at said step (c), said processor determines whether said nonaccess period of time has reached said upper limit holding period of time by referring to said exception key table.

9. An index managing method according to claim 8, wherein said upper limit holding period of time is set beforehand in said exception key value table.

10. An index managing method according to claim 8, wherein said processor periodically conducts said steps (a), (b) and (c) for each of index records included in the same index.

11. A database managing system comprising:

a database storing a plurality of data records and storing an index including a plurality of index records, each of said index records being created by associating an index key value with a storage location of at least one data record in said database relating to said index key value; and a processor for conducting processing of said plurality of data records by using said index, said processor comprising:

(a) means, responsive to a processing request on a certain data record, for checking on the number of associated data records belonging to an index record relating to said data record requested to be processed, on the basis of an index key value defined in said data record requested to be processed;

(b) means for comparing said number of associated data records with a predetermined upper limit number; and (c) means, responsive to arrival of said number of associated data records at said upper limit number, for accessing said data record requested to be processed stored in said database without using said storage location in said database stored in said relating index record.

12. A database managing system comprising:

a database storing a plurality of data records and storing an index including a plurality of index records, each of said index records being created by associating an index key value with a storage location of at least one data record in said database relating to said index key value; and a processor for conducting data processing by using said index, said processor comprising:

(a) means for checking on nonaccess period of time of an index record;

(b) means for comparing said nonaccess period of time with a predetermined upper limit holding period of time; and (c) means, responsive to arrival of said nonaccess period of time at said upper limit holding period of time, for deleting said index record.

13. A medium for use in a database managing system having a database for storing a plurality of data records, data processing being conducted by using an index including a plurality of index records, each of said index records being created by associating an index key value with a storage location of at least one data record in said database relating to said index key value, said medium comprising:

a first code portion, responsive to a processing request on a certain data record, for causing a processor to check on a number of associated data records belonging to an index record relating to said data record requested to be processed, on the basis of an index key value defined in said data record requested to be processed;

a second code portion for causing said processor to compare said number of associated data records with a predetermined upper limit number; and a third code portion, responsive to arrival of said number of associated data records at said upper limit number, for causing said processor to access said data record requested to be processed stored in said database without using said storage location in said database stored in said relating index record.

14. A medium for use in a database managing system having a database for storing a plurality of data records, data processing being conducted by using an index including a plurality of index records, each of said index records being created by associating an index key value with a storage location of at least one data record in said database relating to said index key value, said medium comprising:

a first code portion for causing a processor to check on nonaccess period of time of an index record;

a second code portion for causing said processor to compare said nonaccess period of time with a predetermined upper limit holding period of time; and a third code portion, responsive to arrival of said nonaccess period of time at said upper limit holding period of time, for causing said processor to delete said index record.

15. An index managing method in a database managing system, said database managing system having a database including an index portion and a data portion, data stored in said data portion being accessed by tracing association of index key values stored in said index portion with data storage locations, a plurality of data being associated with a single index key value, said index managing method comprising the steps of:

counting data associated with a single index key value as a number of associated data; and in response to arrival of said number of associated data at a predetermined number, deleting said index key value and a data storage location associated therewith from said index portion.

16. An index managing method in a database managing system having a database including an index portion and a data portion, data stored in said data portion being accessed by tracing association of index key values stored in said index portion with data storage locations, said index managing method comprising the steps of:

registering last accessed time as access time for each index key value of said index portion; and in response to an elapse of a predetermined time from said access time of an index key value, deleting the index key value and a data storage location associated therewith from said index portion.

17. An index managing method in a database managing system having a database including an index portion and a data portion, data stored in said data portion being accessed by tracing association of index key values stored in said index portion with data storage locations, a plurality of data being associated with a single index key value, said index managing method comprising the steps of:

counting data associated with a single index key value as a number of associated data;

in response to arrival of said number of associated data at a predetermined number, deleting said index key value and a data storage location associated therewith from said index portion;

registering last accessed time as access time for each index key value of said index portion; and in response to an elapse of a predetermined time from said access time of an index key value, deleting the index key value and a data storage location associated therewith from said index portion.

* * * * *

UNITED STATES PATENT AND TRADEMARK OFFICE
CERTIFICATE OF CORRRECTION

PATENT NO. : 5,806,058
DATED : September 8, 1998
INVENTOR(S) : Yasuharu Mori, et al.

It is certified that error appears in the above-identified patent and that said Letters Patent is hereby corrected as shown below:

On the title page, in item [56], insert the following:

FOREIGN PATENT DOCUMENTS

| | | | | | | | | | PUBLICATION | COUNTRY OR | | | TRANSLATION | |
|---|---|---|---|---|---|---|---|---|---|---|---|---|---|---|
| | | \multicolumn{7}{c}{DOCUMENT NUMBER} | | | DATE | PATENT OFFICE | CLASS | SUBCLASS | YES | NO |
| | | WO | 95 | 0 | 22 | 2 | 2 | A | 1/19/95 | International | | | | |
| | | EP | 0 | 31 | 54 | 2 | 6 | A | 11/2/88 | European | | | | |
| | | JP | 07 | 0 | 85 | 0 | 93 | A | 7/31/95 | Japan | | | | |
| | | | | | | | | | | | | | | |

Signed and Sealed this

Twentieth Day of April, 1999

*Attest:*

Q. TODD DICKINSON

*Attesting Officer*      Acting Commissioner of Patents and Trademarks